United States Patent
Stricklen

(10) Patent No.: US 9,682,428 B2
(45) Date of Patent: Jun. 20, 2017

(54) APPARATUS AND METHOD FOR MACHINING A WORKPIECE

(71) Applicant: Superior Industries International, Inc., Southfield, MI (US)

(72) Inventor: Richard Stricklen, Leona Valley, CA (US)

(73) Assignee: Superior Industries International, Inc., Southfield, MI (US)

( * ) Notice: Subject to any disclaimer, the term of this patent is extended or adjusted under 35 U.S.C. 154(b) by 200 days.

(21) Appl. No.: 14/525,300

(22) Filed: Oct. 28, 2014

(65) Prior Publication Data

US 2016/0052067 A1  Feb. 25, 2016

Related U.S. Application Data

(60) Provisional application No. 62/040,596, filed on Aug. 22, 2014.

(51) Int. Cl.
*B23B 39/22* (2006.01)
*B23B 35/00* (2006.01)

(52) U.S. Cl.
CPC .............. *B23B 39/22* (2013.01); *B23B 35/00* (2013.01); *B23B 2215/08* (2013.01);
(Continued)

(58) Field of Classification Search
CPC ..... B23B 39/22; B23B 35/00; B23B 2215/08; B23B 2228/21; B23B 2220/32;
(Continued)

(56) References Cited

U.S. PATENT DOCUMENTS 1,918,538 A * 7/1933 Hallenbeck ............ B23Q 16/06
29/38 C
1,973,204 A * 9/1934 Goss ...................... B23Q 17/24
144/2.1
(Continued)

FOREIGN PATENT DOCUMENTS

CA    2839497 A1 * 12/2012 ............... B23C 3/06
DE    19949645 A1 *  4/2001 ............... B23B 5/02
IN    3505KOLNP       2/2014

OTHER PUBLICATIONS

PCT/US2015/46226 International Search Report dated Jan. 12, 2016, 4 pages.

*Primary Examiner* — Sunil K Singh
*Assistant Examiner* — Ryan Rufo
(74) *Attorney, Agent, or Firm* — Warner Norcross & Judd LLP

(57) ABSTRACT

A spindle assembly for machining a cast workpiece includes a fixture that provides rotational movement to the workpiece around a fixture axis. A first spindle provides rotational movement to a cutting tool around a first spindle axis and a second spindle provides rotational movement to a second cutting tool around a second spindle axis. The first spindle axis and the second spindle axis are transverse to the fixture axis. The fixture is disposed between the first spindle and the second spindle. The pivotal movement of the fixture provides access to opposite sides of the workpiece to the first spindle and the second spindle enabling the cutting tools to simultaneously cut opposing sides of the workpiece. The first cutting tool and the second cutting tool are replaceable by a third cutting tool and a fourth cutting tool to cut an alternative or different aperture into the workpiece.

10 Claims, 2 Drawing Sheets

(52) U.S. Cl.
CPC ....... *B23B 2220/32* (2013.01); *B23B 2228/21* (2013.01); *B23B 2247/08* (2013.01)

(58) Field of Classification Search
CPC .......... B23B 2247/08; B23Q 2039/002; B23Q 2039/006; Y10T 408/378; Y10T 408/3788; Y10T 408/3792; Y10T 408/375
See application file for complete search history.

(56) References Cited

U.S. PATENT DOCUMENTS

| | | | | |
|---|---|---|---|---|
| 3,382,741 A | * | 5/1968 | Hackbarth | .............. B23B 39/22 408/40 |
| 3,746,459 A | * | 7/1973 | Kindelan | ................ B23B 39/22 408/37 |
| 3,952,630 A | * | 4/1976 | Fencl | ........................ B23C 3/12 29/894.35 |
| 4,490,079 A | * | 12/1984 | Trevarrow | ............. B21D 53/26 29/894.323 |
| 4,866,834 A | * | 9/1989 | Winkler | .................. B23B 41/00 29/894.3 |
| 5,503,508 A | * | 4/1996 | Amiguet | ............. B23B 31/4006 269/24 |
| 6,345,939 B1 | * | 2/2002 | Poeting | ................. B23B 41/003 408/236 |
| 6,926,593 B1 | | 8/2005 | Carroll et al. | |
| 7,044,690 B1 | * | 5/2006 | Charvat | .................. B23B 35/00 29/26 A |
| 8,172,489 B2 | * | 5/2012 | Prust | ................. B23B 31/16275 269/134 |
| 2001/0039732 A1 | | 11/2001 | Smyth | |
| 2008/0008549 A1 | * | 1/2008 | Schawe | .................... B23G 1/02 409/66 |
| 2008/0213057 A1 | | 9/2008 | Betschon et al. | |
| 2014/0271016 A1 | * | 9/2014 | Chou | .................... B23B 31/185 409/224 |

* cited by examiner

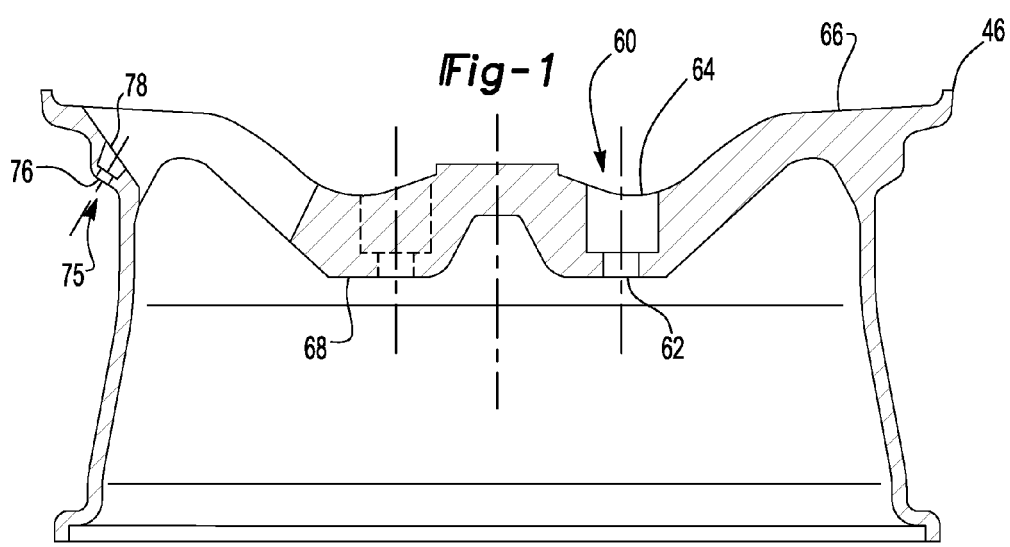
Fig-1
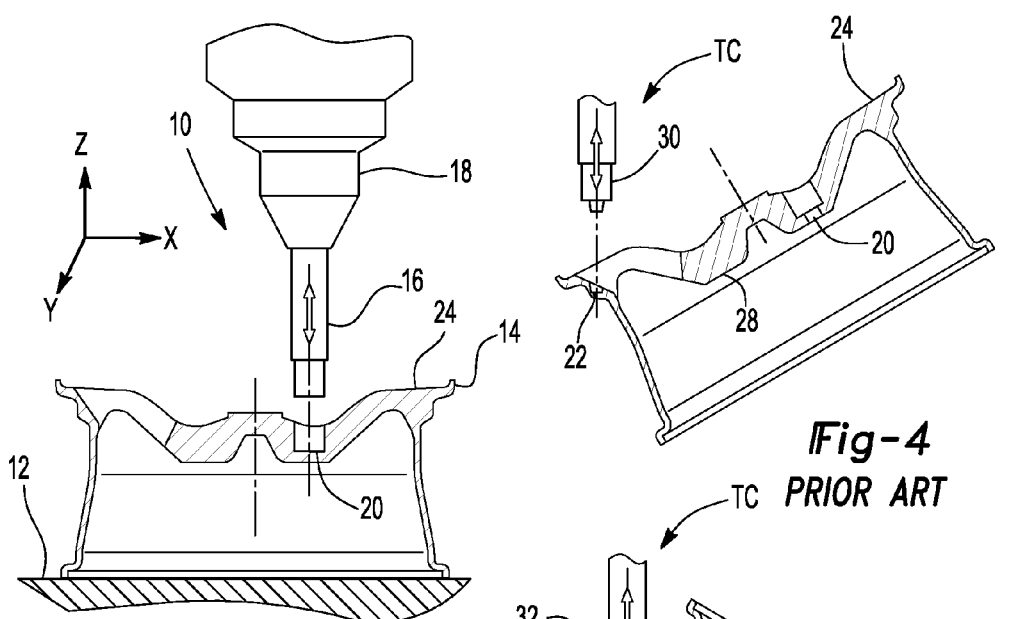
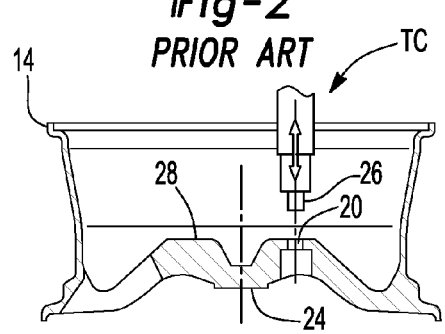
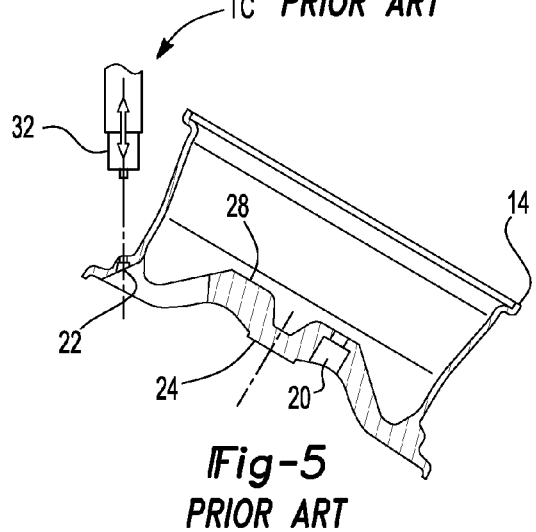
Fig-2 PRIOR ART
Fig-3 PRIOR ART
Fig-4 PRIOR ART
Fig-5 PRIOR ART

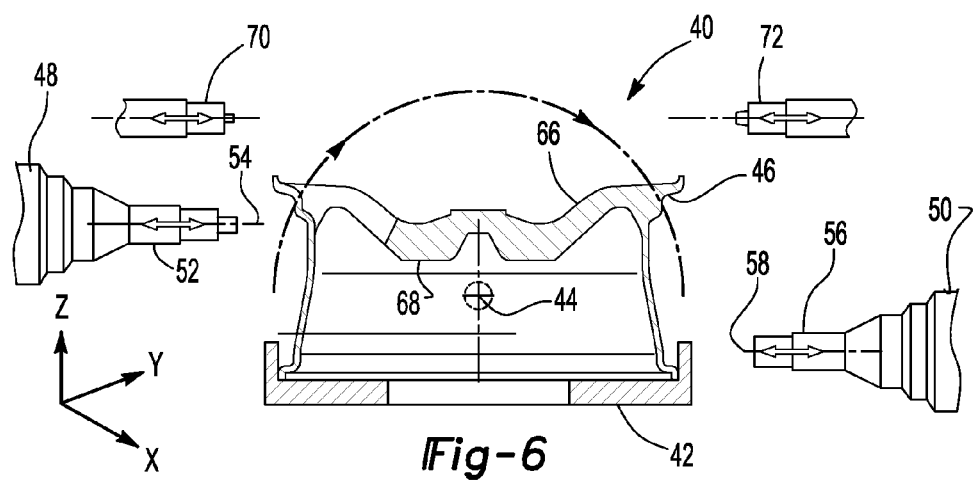
Fig-6
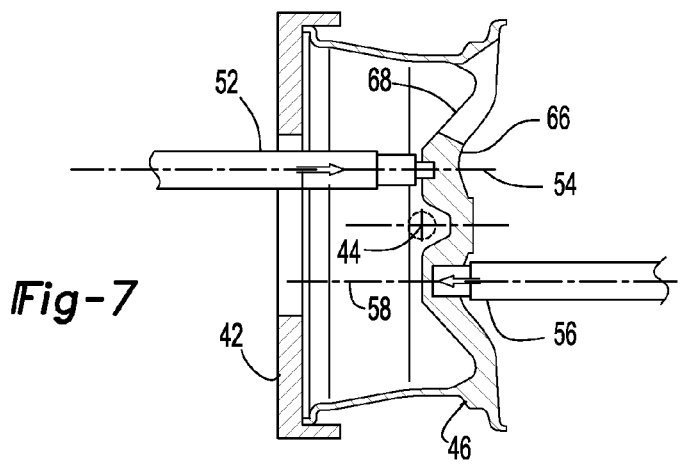
Fig-7
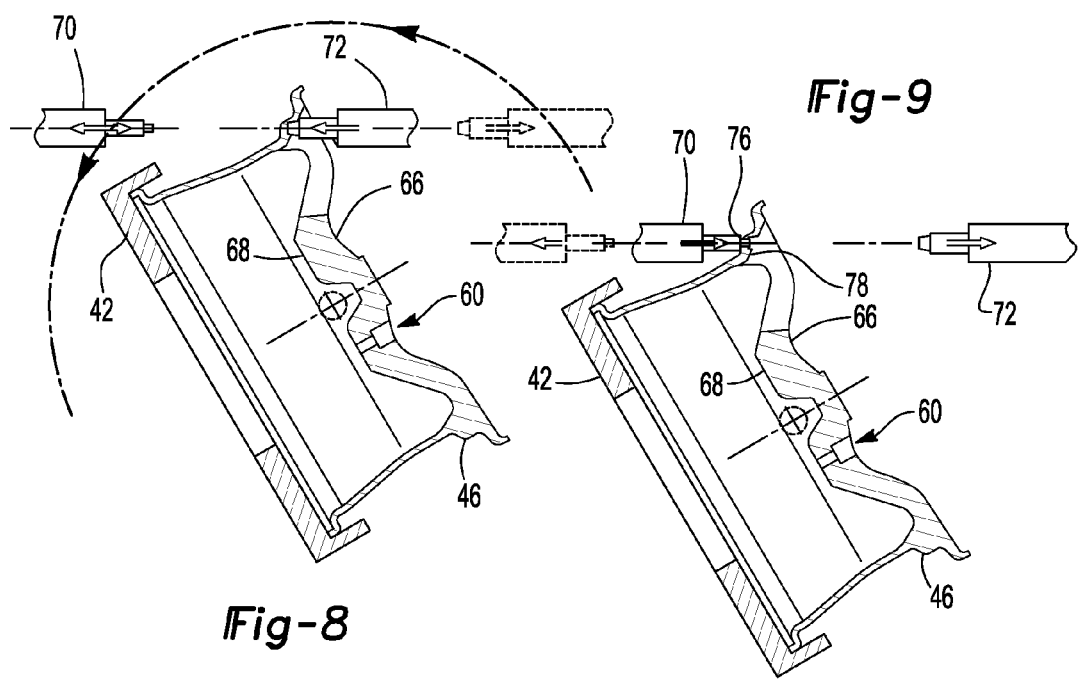
Fig-8
Fig-9

APPARATUS AND METHOD FOR MACHINING A WORKPIECE

PRIOR APPLICATION

The present application claims priority to U.S. Provisional Patent Application No. 62/040596 filed Aug. 22, 2014.

TECHNICAL FIELD

The present invention relates generally to an apparatus and method of machining a workpiece. More specifically, the present invention relates to a spindle machine for cutting features into a workpiece.

BACKGROUND

Machining features into a cast workpiece is known to be a bottle neck in a mass production facility. One such example of bottleneck in the mass production of a cast workpiece is machining a cast wheel 46 like that shown in FIG. 1. The cast wheel 46 typically includes cut lug nut apertures 60 and a cut valve stem aperture 75, the cutting of which creates a manufacturing bottleneck.

Cast wheels for use on road vehicles are becoming increasingly desirable, particularly when light weight alloys are used to reduce mass. One detriment to increasing market share of cast wheels, in spite of potential mass savings, is the slow manufacturing process when compared to wheels stamped from sheet metal. While the casting process is slow relative to forming sheet metal, a bottleneck in the manufacturing process has been the machine operation, in particular when forming apertures to receive lugs and valve stems. For example, referring to FIG. 2, a prior art spindle machine is generally shown at 10. The current spindle machine 10 includes a fixture 12 onto which a wheel 14 is mounted. A cutting tool 16 is affixed to a spindle 18. The spindle 18 and cutting tool 16 are oriented in a vertical direction along a Z axis of a Cartesian coordinate system.

The spindle 18 moves in a circumferential direction around the fixture 12 as will be further explained below. The fixture 12 rotates around a Y axis, as also will be explained herein further below. In this manner, the cutting tool 16 is moved to a plurality of locations around the wheel 14 to cut desired apertures.

The steps of forming lug apertures 20 in the wheel 14 are represented in FIGS. 2 through 4. As shown in FIG. 2, the wheel 14 is mounted on the fixture 12 in a vertical orientation and the cutting tool 16 is moved to the location of the first lug aperture 20. The spindle 18 moves the cutting tool 16 in a circumferential direction around the Z axis cutting a plurality of lug apertures 20 into a face 24 of the wheel 14. When the wheel is rotated to the orientation shown in FIG. 3, a second cutting tool 26 is affixed to the spindle 18 as identified by TC of FIG. 3 for identifying a Tool Change. At that time, the wheel is rotated around the Y axis so that the rear surface 28 of the wheel faces the cutting tool 16. In FIG. 4, the second cutting tool 26 moves in a circumferential direction around the Z axis for cutting a second configuration into the rear surface 28 of the wheel 14, in this example, a complimentary feature in the aperture 20.

When step of machining the wheel 14 that is shown in FIG. 4 is completed, the wheel 14 is again rotated around the Y axis and an additional tool change TC is performed to affix a third cutting tool 30 to the spindle 18. The fixture 12 again pivots the wheel 14 on the Y axis to position the third cutting tool 30 at the location of the valve stem aperture 22. Once the third cutting tool 30 forms a portion of the valve stem aperture 22, the fixture 12 again rotates the wheel 14 on the Y axis to the orientation shown in FIG. 5 and conducts an additional tool change TC to a fourth cutting tool 32 to cut a rear portion of the valve stem aperture 22. Once completed, another tool change TC is performed and the fixture 12 rotates the wheel to original position at which time the wheel 14 is removed.

It should be understood to those of ordinary skill in the art that four tool changes TC are required and four rotations of the fixture around the Y axis are conducted through steps shown in FIGS. 2 through 5. The cutting process described above has become a bottleneck to the manufacturing process of a cast wheel. It would be desirable to streamline this process to improve efficiency and reduce cycle time to reduce the cost of manufacturing.

SUMMARY

A spindle assembly for machining a cast workpiece includes a fixture for securing a workpiece. The fixture provides rotational movement to the workpiece around a fixture axis defined by the fixture. The spindle axis is substantially horizontal for improved gravity assisted chip flow out of the work zone. A first spindle extends from an opposing direction to a second spindle. The first spindle provides rotational movement to a cutting tool around a first spindle axis and the second spindle provides rotational movement to a second cutting tool around a second spindle axis. The first spindle axis and the second spindle axis are each transverse to the fixture axis. The fixture is disposed between the first spindle and the second spindle and translates pivotal movement to the workpiece around the fixture axis. The pivotal movement provides access to opposite sides of the workpiece to the first spindle and the second spindle enabling the first cutting tool and the second cutting tool to simultaneously cut opposing sides of the workpiece. The first cutting tool and the second cutting tool are simultaneously replaceable by a third cutting tool and a fourth cutting tool to cut an alternative or different aperture into the workpiece.

The assembly of the present invention reduces the amount of time required to machine apertures into a workpiece, such as, for example, a wheel by up to 50%. The orientation of the workpiece relative to opposing spindles capable of simultaneously machining contours or apertures having different configurations is one of many unique and inventive aspects that provide more rapid cycle time. Furthermore, only a single tool change is required on the workpiece that includes two different machine contours or apertures. This differs considerably from the prior art device that requires at least four tool changes to reach the same workpiece configuration.

BRIEF DESCRIPTION OF THE DRAWINGS

Other advantages of the present invention will be readily appreciated, as the same becomes better understood by reference to the following detailed description when considered in connection with the accompanying drawings, wherein:

FIG. 1 shows a cross-sectional view of a workpiece;

FIG. 2 shows a schematic view of a prior art spindle machine in a first process stage;

FIG. 3 shows a second process stage of a prior art spindle machine;

FIG. 4 shows a third process stage of a prior art spindle machine;

FIG. 5 shows a fourth process stage of a prior art spindle machine;

FIG. 6 shows a schematic view of a spindle machine of the present invention;

FIG. 7 shows a first processing stage of the spindle machine of the present invention; and FIGS. 8 and 9 show the second processing stage of the spindle machine of the present invention.

DETAILED DESCRIPTION

A spindle assembly for machining a cast workpiece such as, for example, a wheel is generally shown at 40 of FIG. 6. A fixture 42 is used to secure the workpiece, such as, for example a wheel 46 for processing in the assembly 40. It should be understood to those of ordinary skill in the art that the description of a wheel in the present application is merely exemplary and that other cast components may also be processed in the subject assembly 40. The fixture 42 defines a fixture axis 44 around which a wheel 46 is pivoted.

A first spindle 48 extends toward the fixture 42 in an opposite direction as does a second spindle 50. Therefore, the first spindle 48 and the second spindle 50 extend in opposing directions on opposite sides of the fixture 42. The assembly 40 is defined by a 3 axis Cartesian coordinate system having an x, y and z axis as best represented in FIG. 6. The first spindle 42 provides rotational movement to a first cutting tool 52 around a first spindle axis 54. The second spindle 50 provides rotational movement to a second cutting tool 56 around a second spindle axis 58. The first cutting tool 52 and the second cutting tool 56 extend along the y axis of the Cartesian coordinate system in opposite directions. The fixture axis 44 extends along the x axis of the Cartesian coordinate system shown in FIG. 6. This arrangement enables the first cutting tool 52 and the second cutting tool 56 to simultaneously cut opposite sides of the wheel 46 providing process efficiencies not previously realized.

The first spindle 48 is moveable along both the y axis and the x axis of the Cartesian coordinate system. Likewise, the second spindle 50 is also moveable around the x axis and y axis of the Cartesian coordinate system. Therefore, the first spindle axis 54 and the second spindle axis 58 are coaxial and displaceable into a parallel relationship. As such, the first cutting tool 52 and the second cutting tool 56 are enabled to simultaneously cut different locations of the wheel of 46. For example, the assembly 40 is configured to cut a plurality of lug nut apertures 60 (FIG. 7) into the wheel 14. A typical lug nut aperture 60 includes the first lug nut feature 62 and a second lug nut feature 64 (best seen in FIG. 1). The first lug nut feature 62 is configured to receive a nut (not shown) and the second lug nut feature 64 is configured to receive a stud (not shown). Each of these features requires a different cutting tool to achieve a proper configuration. The assembly 40 provides the ability to simultaneously cut different of the plurality of lug nut apertures 60 by displacing the first spindle axis 54 and the second spindle axis 58 into a parallel relationship from a coaxial relationship. It should be understood to those of ordinary skill in the art that the assembly 40 of the present invention provides three rotational axes, the fixture axis 44, the first spindle axis 54, and the second spindle axis 58. The benefit of having three rotational axes is best explained by referring to FIGS. 7 through 9.

FIGS. 6 through 9 show the two positions of the wheel 46 being processed through the assembly 40 of the present invention. As shown in FIG. 6, the wheel 46 is placed atop the fixture 42 having a wheel face 66 facing in an upward direction and a rear surface 68 facing in a downward direction. When secured, the fixture 42 pivots the wheel 46 on the fixture axis 44 exposing the face 66 to the first cutting tool 54 and the rear surface 68 to the second cutting tool 56 as best represented in FIG. 7. The first cutting tool 54 and the second cutting tool 56 are moved toward the wheel 46 along the z axis (FIG. 6) to simultaneously engage different positions of the wheel 46 such as, for example, different locations of lug nut apertures 60. Therefore, the first cutting tool 54 cuts the first lug nut feature 62 into one lug nut aperture simultaneously with the second cutting tool 56 cutting a second lug nut feature 64 into a different lug nut aperture. The first spindle 48 and the second spindle 50 move around the x axis and along the y axis of the Cartesian coordinate system (FIG. 3) enabling the first cutting tool 54 and the second cutting tool 56 to cut a plurality of lug nut apertures 62 without having to make a single tool change as required of the prior art assembly. This inventive aspect of the subject spindle machine 40 reduces cycle time by around 50%.

Once the desired number of lug nut apertures 60 has been cut, a tool change is performed where the first cutting tool 54 is replaced with a third cutting tool 70 and the second cutting tool 56 is replaced with a fourth cutting tool 72. The fixture 42 rotates the wheel 46 again around fixture axis 44 orienting the wheel as shown in FIG. 8. The first spindle 48 moves the third cutting tool 70 to a predetermined location for cutting a valve stem aperture 74. Simultaneously, the second spindle 50 moves the fourth cutting tool 72 to a position required to cut an opposite portion of the valve stem aperture 74. In this instance, because only a single valve stem aperture 74 is required, the first cutting tool 70 and the second cutting tool 72 sequentially cut a first valve stem feature 76 and a second valve stem feature 78.

Subsequent to cutting the valve stem aperture 74, the fixture 42 rotates the completed wheel 46 around the fixture axis to starting position as shown in FIG. 6. At this time, the finished wheel 46 is removed from the fixture 42 and a new wheel is positioned on the fixture 42. For further efficiency, the wheel 46 is processed in reverse order so that the third cutting tool 70 and the fourth cutting tool 72 cut the valve stem aperture 74 before a tool change occurs to replace the third cutting tool 70 and the fourth cutting tool 72 with the first cutting tool 54 and the second cutting tool 56, respectively. Therefore, the wheel 46 is processed in reverse order eliminating redundant tool changes and further reducing cycle time.

Obviously, many modifications and variations of the present invention are possible in light of the above teachings. The foregoing invention has been described in accordance with the relevant legal standards; thus, the description is merely exemplary than limiting in nature. Variations and modifications to the disclosed embodiment may become apparent to those skilled in the art and do come within the scope of the invention. Accordingly the scope of the legal protection afforded this invention can only be determined by studying the following claims.

What is claimed is:

1. A method for providing a plurality of apertures in a cast wheel, comprising the steps of:

providing a first cutting tool and a second cutting tool in an opposing relationship having a fixture disposed therebetween;

mounting a cast wheel on said fixture;

pivoting said fixture on a fixture axis for reorienting the cast wheel to a position complimentary to said first cutting tool and said second cutting tool; and cutting a plurality of apertures into opposite sides of the cast wheel with said first cutting tool and said second cutting tool by simultaneously moving said first cutting tool and said second cutting tool in opposite directions along a first axis of a Cartesian coordinate system, with said first cutting tool cutting to a depth necessary to define a first feature of each aperture simultaneously with said second cutting tool cutting to a depth necessary to define a second feature of each aperture at a location offset from said first cutting tool and moving said first cutting tool and said second cutting tool sequentially along a second axis and a third axis of the Cartesian coordinate system.

2. The method set forth in claim 1, wherein said step of cutting a plurality of apertures is further defined by cutting a plurality of lug apertures circumferentially around said second axis.

3. The method set forth in claim 1, wherein said step of cutting a plurality of apertures is further defined by cutting a valve stem aperture.

4. The method set forth in claim 1, wherein said step of providing first and second cutting tools is further defined by aligning said first and second cutting tools along the first axis of the Cartesian coordinate system.

5. The method set forth in claim 1, wherein said step of sequentially cutting a plurality of apertures into the cast wheel is further defined by cutting a first configuration with said first cutting tool and cutting a second configuration with said second cutting tool.

6. The method set forth in claim 1, further including the step of changing said first and said second cutting tool to a third and fourth cutting tool for cutting a valve stem aperture.

7. The method set forth in claim 6, wherein said step of changing said first and said second cutting tool is further defined by performing a single change of said first and said second cutting tool for each wheel.

8. The method set forth in claim 1 wherein said step of sequentially cutting a plurality of apertures into the cast wheel is further defined by cutting a first portion of the aperture with said first cutting tool and cutting a second portion of the aperture with said second cutting tool without reorienting the wheel.

9. The method set forth in claim 8, wherein said step of cutting the first portion of the aperture and cutting a second portion of the aperture is further defined by cutting the first portion of the aperture into a first configuration and cutting the second portion of the aperture into a second configuration, with the first configuration being different from the second configuration.

10. The method set forth in claim 1, further including the step of reversing a cutting sequence to cut a valve stem aperture with a third and a fourth cutting tool and then changing said third and said fourth cutting to tool to said first and said second cutting tool.

* * * * *